United States Patent
Wershofen et al.

(10) Patent No.: US 7,745,659 B2
(45) Date of Patent: *Jun. 29, 2010

(54) PROCESS FOR THE PRODUCTION OF LIQUID, STORAGE-STABLE ORGANIC ISOCYANATES WITH A LOW COLOUR INDEX HAVING CARBODIIMIDE- AND/OR URETONE IMINE GROUPS

(75) Inventors: Stefan Wershofen, Mönchengladbach (DE); Manfred Schmidt, Dormagen (DE); Hans-Georg Pirkl, Leverkusen (DE); Torsten Hagen, Essen (DE)

(73) Assignee: Bayer MaterialScience AG, Leverkusen (DE)

( * ) Notice: Subject to any disclaimer, the term of this patent is extended or adjusted under 35 U.S.C. 154(b) by 349 days.

This patent is subject to a terminal disclaimer.

(21) Appl. No.: 11/298,727

(22) Filed: Dec. 8, 2005

(65) Prior Publication Data
US 2006/0128928 A1 Jun. 15, 2006

(30) Foreign Application Priority Data
Dec. 14, 2004 (DE) .................. 10 2004 060 038

(51) Int. Cl.
*C07C 267/00* (2006.01)
*C07C 249/00* (2006.01)
*C08G 18/02* (2006.01)
*C08G 18/08* (2006.01)

(52) U.S. Cl. .............. 560/334; 252/182.2; 252/182.21; 521/160; 521/161; 528/48; 560/336

(58) Field of Classification Search ................ 521/160, 521/161; 560/334, 336; 252/182.2, 182.21; 528/48
See application file for complete search history.

(56) References Cited

U.S. PATENT DOCUMENTS

| 2,853,473 | A |   | 9/1958  | Cambell et al ............. 260/77.5 |
|-----------|---|---|---------|--------------------------------------|
| 3,769,318 | A | * | 10/1973 | Windemuth et al. .......... 560/24   |
| 4,067,820 | A |   | 1/1978  | Wagner et al. .............. 252/426 |
| 4,088,665 | A |   | 5/1978  | Findeisen et al. .... 260/453 AM    |
| 4,120,884 | A | * | 10/1978 | Woerner et al. ............. 560/331 |
| 4,424,288 | A |   | 1/1984  | Patton, Jr. et al. ............. 521/99 |
| 4,496,723 | A | * | 1/1985  | Hoppe et al. ................ 540/301 |
| 4,656,223 | A | * | 4/1987  | Konig et al. ................ 524/871 |
| 5,202,358 | A | * | 4/1993  | Scholl et al. ................ 521/160 |
| 5,342,881 | A | * | 8/1994  | Muller et al. ............... 524/700 |
| 5,354,888 | A |   | 10/1994 | Scholl ........................ 564/252 |
| 5,359,129 | A | * | 10/1994 | Shimizu et al. ............. 560/332 |
| 6,120,699 | A | * | 9/2000  | Narayan et al. .......... 252/182.2 |

FOREIGN PATENT DOCUMENTS

EP   1 054 029  A1   11/2000

* cited by examiner

*Primary Examiner*—Milton I Cano
*Assistant Examiner*—Benjamin J Gillespie
(74) *Attorney, Agent, or Firm*—N. Denise Brown; John E. Mrozinski, Jr.; Noland J. Cheung

(57) ABSTRACT

The invention relates to a process for the production of liquid, storage-stable isocyanate mixtures with a low color index having carbodiimide-(CD) and/or uretone imine (UI) groups, the isocyanate mixtures that can be obtained by this process and their use for the production of blends with other isocyanates or for the production of isocyanate group-containing pre-polymers and also of polyurethane plastics, preferably polyurethane foamed plastics.

4 Claims, No Drawings

US 7,745,659 B2

PROCESS FOR THE PRODUCTION OF LIQUID, STORAGE-STABLE ORGANIC ISOCYANATES WITH A LOW COLOUR INDEX HAVING CARBODIIMIDE- AND/OR URETONE IMINE GROUPS

FIELD OF THE INVENTION

The invention relates to a process for the production of liquid, storage-stable isocyanate mixtures with a low color index having carbodiimide (CD) and/or uretone imine (UI) groups, the isocyanate mixtures obtainable by this process and their use for the production of blends with other isocyanates or for the production of isocyanate group-containing pre-polymers and of polyurethane plastics, preferably polyurethane foams.

BACKGROUND OF THE INVENTION

Isocyanate mixtures having-CD and/or UI groups may be produced simply with the highly effective catalysts from the phospholine series, in particular the phospholine oxide series, by the process according to U.S. Pat. No. 2,853,473, U.S. Pat. No. 6,120,699 and EP-A-515 933.

The high catalytic activity of phospholine catalysts, in particular phospholine oxide catalysts, is desired on the one hand to activate the carbodiimidization reaction under mild temperature conditions, but on the other hand there has hitherto been no known process for ensuring that phospholine or phospholine oxide catalysis is effectively stopped without restriction. The carbodiimidized isocyanates have a tendency to post-react, i.e. they gasify as a result of $CO_2$ formation. This then leads, particularly at higher temperatures, to a build-up of pressure for example in the storage containers.

There has been no shortage of attempts to find an effective means of stopping phospholine catalysis. Such stoppers are mentioned e.g. in patent specifications DE-A-25 37 685, EP-A-515 933, EP-A-609 698 and U.S. Pat. No. 6,120,699 and comprise e.g. acids, acid chlorides, chloroformates, silylized acids and halides of elements of the main group. Stopping the catalyst with acids which, e.g. may also be present as acid chlorides, is not sufficiently effective.

According to the disclosure of EP-A-5 15 933, CD/UI-containing isocyanate mixtures produced by phospholine catalysis are stopped with at least an equimolar quantity, preferably a 1-2 fold molar quantity in relation to the catalyst used of e.g. trimethylsilyl trifluoromethane sulfonate (TMST). In practice however, it has proved that CD/UI-containing isocyanates produced in this way are not universally suitable for the production of pre-polymers, i.e. reaction products of these CD/UI-containing isocyanates with polyols. The reaction products produced accordingly from polyols and the CD/UI-modified isocyanates have a tendency to gasify, which can lead to a build-up of pressure in transport containers or to foaming during handling of these products.

This problem can be avoided by using the silylized acid used according to EP-A-515 933 in higher molar equivalents (e.g. 5:1-10:1 in relation to the catalyst) to stop the phospholine catalyst. In practice however, it is then found that the CD/UI-modified isocyanates obtained have a considerably poorer color index. This therefore also applies to the pre-polymers produced from them.

This applies also if the phospholine catalyst is stopped with acids of the trifluoromethanesulfonic acid type according to U.S. Pat. No. 6,120,699. Pre-polymers produced from these also have a considerably increased color index.

SUMMARY OF THE INVENTION

The present invention therefore provides a process for the production of liquid, storage-stable and light isocyanate mixtures having carbodiimide- and/or uretone imine groups, which do not have the defects discussed and produce liquid, storage-stable isocyanate mixtures with low color indices.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention relates to a process for the production of organic isocyanates having carbodiimide- and/or uretone imine groups, in which one or more organic isocyanates with a Hazen color index of $\leq 100$ APHA, preferably $\leq 50$ APHA are partially carbodiimidized with catalysts of the phospholine type, and the carbodiimidization reaction is then stopped, characterized in that an alkylation agent is used as the stopper.

The Hazen color index can be measured according to DIN/EN/ISO 6271-2 (draft September 2002) without solvent against water as a reference in a layer thickness of 5 cm. The measuring device used can be e.g. a Dr. Lange LICO 300 photometer.

A strong alkylation agent is preferably used. Alkylation agents are substances of the general formula R-X, in which R represents an organic radical and X the so-called leaving group. In the case of strong alkylation agents, X constitutes a good leaving group, i.e. a radical which is only slightly nucleophilic. In other words, X constitutes a good leaving group if X is derived from a strong acid HX and is thus very slightly basic. Trialkyloxonium compounds, trifluoromethane sulfonates and dialkyl sulfates are cited as examples of compounds with good leaving groups in 'Jerry March, Advanced Organic Chemistry, $3^{rd}$ Edition (1985), John Wiley & Sons, page 315'.

The present invention relates also to the organic isocyanates having carbodiimide and/or uretone imine groups, which are obtainable by the process stated above. These organic isocyanates having carbodiimide and/or uretone imine groups are liquid at room temperature and, depending on the CD/UI content and/or the isocyanate used, down to low temperatures (e.g. $0°$ C.).

The present invention also provides for the use of the organic isocyanates having carbodiimide and/or uretone imine groups according to the invention for the production of blends with other isocyanates or for the production of isocyanate group-containing pre-polymers with an improved color index.

Finally, the invention also provides the use of the organic isocyanates having carbodiimide and/or uretone imine groups according to the invention and the isocyanate blends and/or pre-polymers with an improved color index produced from them for the production of polyurethane plastics.

Surprisingly, liquid, storage-stable isocyanate mixtures with low color indices can be obtained by the process according to the invention, in contrast to the teachings of DE-A-25 04 334, in which e.g. deactivation of the catalyst by alkylation agents is described as insufficient.

Alkylation agents are also disclosed in U.S. Pat. No. 4,424,288 for the deactivation of the catalyst, where a raw polyphenyl polymethylene polyisocyanate, which can be produced by aniline-formaldehyde condensation and subsequent phosgenation ('raw MDI'), and which contains a maximum of 70 wt. % methylene diphenyl diisocyanate isomers, is used as raw material. However the starting material already has a dark color per se, so that a light-colored product cannot be obtained by this process.

Any organic isocyanates with a Hazen color index of ≦100 APHA, preferably ≦50 APHA can be used as starting materials for the process according to the invention. However, the process according to the invention is preferably used for carbodiimidization of organic diisocyanates, which are used in polyurethane chemistry.

The following are particularly suitable:

Aromatic diisocyanates such as toluene-2,4- and/or toluene-2,6-diisocyanate (TDI), 2,2'-, 2,4'- and/or 4,4'-methylene diphenyl diisocyanate (MDI) or any mixtures of such aromatic diisocyanates, Polyisocyanate mixtures of the methylene diphenyl series containing 80 to 100 wt. % monomeric methylene diphenyl diisocyanate isomers and 0 to 20 wt. % of higher than difunctional polyisocyanates of the methylene diphenyl series, wherein the methylene diphenyl diisocyanate isomers are from 0 to 100 wt. % 4,4'-methylene diphenyl diisocyanate, 100 to 0 wt. % 2,4'-methylene diphenyl diisocyanate and 0 to 8 wt. % 2,2'-methylene diphenyl diisocyanate, and wherein the percentages given make up a total of 100%.

Organic isocyanates preferred as starting materials are in particular aromatic diisocyanates such as toluene-2,4- and/or toluene-2,6-diisocyanate (TDI), 2,2'-, 2,4'- and/or 4,4'-methylene diphenyl diisocyanate (MDI) or any mixtures of such aromatic diisocyanates. 2,2'-, 2,4'- and/or 4,4'-methylene diphenyl diisocyanate (MDI) and or any mixtures of such aromatic diisocyanates, wherein the total of 2,2'-, 2,4'- and/or 4,4'-methylene diphenyl diisocyanate in the starting material (organic isocyanate) amounts to at least 85 wt. %, the methylene diphenyl diisocyanate isomers are from 0 to 100 wt. % of 4,4'-methylene diphenyl diisocyanate, 100 to 0 wt. % of 2,4'-methylene diphenyl diisocyanate and 0 to 8 wt. % of 2,2'-methylene diphenyl diisocyanate, and wherein the percentages given make up a total of 100% are particularly preferred. 2,2'-, 2,4'- and/or 4,4'-methylene diphenyl diisocyanate (MDI) or any mixtures of aromatic diisocyanates wherein the total of 2,2'-, 2,4'- and/or 4,4'-methylene diphenyl diisocyanate in the starting material (organic isocyanate) amounts to at least 90 wt. %, and the methylene diphenyl diisocyanate isomers are from 0 to 100 wt. % of 4,4'-methylene diphenyl diisocyanate, 100 to 0 wt. % of 2,4'-methylene diphenyl diisocyanate and 0 to 8 wt. % of 2,2'-methylene diphenyl diisocyanate, and wherein the percentages given make up a total of 100%, are more particularly preferred. In particular, 2,2'-, 2,4'- and/or 4,4'-methylene diphenyl diisocyanate (MDI) or any mixtures of aromatic diisocyanates, wherein the total of 2,2'-, 2,4'- and/or 4,4'-methylene diphenyl diisocyanate in the starting material (organic isocyanate) amounts to at least 99 wt. %, the methylene diphenyl diisocyanate isomers are from 0 to 100 wt. % of 4,4'-methylene diphenyl diisocyanate, 100 to 0 wt. % of 2,4'-methylene diphenyl diisocyanate and 0 to 8 wt. % of 2,2'-methylene diphenyl diisocyanate, and wherein the percentages given make up a total of 100%, are most particularly preferred.

The process according to the invention is carried out in the presence of catalysts of the phospholine type. The catalysts of the phospholine type are known for example from EP-A-515 933 and U.S. Pat. No. 6,120,699. Typical examples of these catalysts are for example the mixtures of phospholine oxides of the formula:

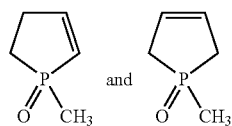

known in the art.

The quantity of catalyst used depends on the quality of the starting isocyanate. The simplest way of determining the catalyst quantity required in each case is to carry out a preliminary test.

The carbodiimidization reaction is conventionally carried out in the temperature range of 50 to 150° C., preferably of 60 to 100° C. However, significantly higher reaction temperatures are also possible (up to ca 280° C.). The optimum reaction temperature depends on the type of starting isocyanate and/or the catalyst used and can be determined in a simple preliminary test.

The carbodiimidization reaction is generally stopped on reaching a degree of carbodiimidization (degree of carbodiimidization is the percentage of carbodiimidized isocyanate groups in relation to the total quantity of isocyanate groups present in the starting isocyanate) of 3 to 50%, preferably 5 to 30%.

The degree of carbodiimidization can be determined during the course of the process according to the invention by determining the NCO value e.g. by titration known per se to the person skilled in the art or by means of online analytical methods. A suitable online analytical method is e.g. near-infrared analysis or middle-infrared analysis.

The degree of carbodiimidization can also be recognized during the course of the process according to the invention e.g. by the quantity of carbon dioxide escaping from the reactor mixture. This volumetrically measurable quantity of carbon dioxide thus provides information at any point in time about the degree of carbodiimidization achieved.

Additionally, other suitable offline or online process-monitoring methods known to the person skilled in the art can also be used in principle.

To terminate the carbodiimidization reaction, at least the equimolar quantity, particularly preferably a 1-20 fold molar excess, most particularly preferably a 1-10 fold molar excess, in relation to the catalyst, of an alkylation agent or a mixture of different alkylation agents is used as a stopper. The alkylation agent or the mixture of different alkylation agents is preferably used here as the sole stopper.

The alkylation agents are presumably in a position to alkylate, and thus to deactivate, catalysts of the phospholine oxide type. Accordingly, all alkylation agents capable of deactivating the catalyst of the phospholine oxide type by alkylation, and thus stopping carbodiimidization, are suitable as stoppers according to the invention. Suitable alkylation agents can easily be determined by the person skilled in the art by means of simple tests.

Preferred alkylation agents are esters of trifluoromethanesulfonic acid, esters of inorganic acids (preferably strong inorganic acids) or trialkyloxonium compounds.

Suitable esters of trifluoromethanesulfonic acid are in particular compounds of the structure $CF_3—SO_3—R^1$, wherein $R^1$ is a (cyclo)aliphatic or araliphatic radical, which may optionally also contain atoms different from carbon and hydrogen. $R^1$ may have a branched or linear carbon chain and optionally also one or more carbon-carbon multiple bonds. Aliphatic esters of trifluoromethanesulfonic acid are preferred, methyl-, ethyl-, propyl-, butyl- and pentylesters of trifluoromethanesulfonic acid being particularly preferred.

Suitable esters of strong inorganic acids are e.g. esters of sulfuric acid or of phosphoric acid, i.e. compounds of the structure $SO_2(OR^3)_2$ or $OP(OR^3)_3$, wherein $R^3$ is a (cyclo)

aliphatic or araliphatic radical, which may optionally also contain atoms different from carbon and hydrogen. $R^3$ may have a branched or linear carbon chain and may optionally contain one or more carbon-carbon multiple bonds. Aliphatic diesters of sulfuric acid are preferred, dimethyl- and diethyl-esters of sulfuric acid being preferred in particular.

Suitable trialkyloxonium compounds are e.g. compounds of the structure $R^4{}_3O\,Y$, wherein $R^4$ is a methyl- or an ethyl radical. Y represents a non-nucleophilic anion such as e.g. tetrafluoroborate, hexafluorophosphate or hexafluoroantimonate.

As an alternative to the sole use of alkylation agents as stoppers, a combination of an alkylation agent and an acid and/or an acid chloride and/or a sulfonic acid ester can also be used according to the invention as an additional stabilizer. By also using an additional stabilizer, it is possible to reduce the quantity of alkylation agent used. This stabilizer can be added either at the same time as the stopper or in a subsequent step.

Optionally halogenated, aliphatic and/or cycloaliphatic and/or aromatic mono-, di- and/or polycarboxylic acids such as e.g. acetic acid, adipic acid, cyclohexane dicarboxylic acid, α-chloropropionic acid, benzoic acid, phthalic acid, isophthalic acid etc., as well as sulfonic acids, HCl, sulfuric acid and/or phosphoric acid or their mono- and/or diesters such as e.g. dibutylphosphate, may be used as acids. The acid chlorides derived from the optionally halogenated, aliphatic and/or cycloaliphatic and/or aromatic mono-, di- and/or polycarboxylic acids or sulfonic acids as well as carbamic acid chlorides, such as e.g. n-butyl carbamic acid chloride, may be used as acid chlorides. p-toluenesulfonic methylester, p-toluenesulfonic ethyl ester can be used e.g. as sulfonic acid esters.

The additional stabilizers are added in total quantities of 10 to 1000 ppm (1 ppm: 1 part by weight to 1000000 parts by weight), preferably 10 to 500, particularly preferably 50 to 250 ppm, in relation to the organic isocyanates having carbodiimide and/or uretone imine groups.

The reaction product of carbodiimidization may contain the color stabilizers conventionally added to isocyanates. The timing of the addition of these is not critical. The color stabilizers may be added either to the isocyanate used as the starting material before carbodiimidization or to the reaction product once the reaction is complete. It is also possible to add color stabilizers both to the starting material and to the reaction product. Such stabilizers are generally known to the person skilled in the art and may include e.g. substances from the group of sterically hindered phenols, phosphites or tertiary amines. The color stabilizers may be used respectively alone or in mixture with other representatives of the same or different substance groups. The quantities of color stabilizers used are of the order known to the person skilled in the art, conventionally in the range of 100 ppm to 10,000 ppm for the single substance or the mixture, in relation to the isocyanate used as the starting material or the reaction product of carbodiimidization.

It has been found that by adding the alkylation agent alone or in combination with an acid and/or an acid chloride and/or a sulfonic acid ester as an additional stabilizer by the process according to the invention, it is possible both to stop phospholine catalysis effectively and at the same time to achieve a low color index in the isocyanate produced and the pre-polymers obtained from it. When using the silylized acid as a stopper according to the art (EP-A-515 933), phospholine catalysis can be effectively stopped only with the addition of large quantities of silylized acid, which, however, leads to increased color indices in the isocyanate mixture thus produced and the pre-polymers produced from it.

Isocyanate group-containing pre-polymers are obtained from the reaction of the organic isocyanates having carbodiimide and/or uretone imine groups produced by the process according to the invention with the polyols conventional in polyurethane chemistry. Suitable polyols are both single, polyvalent alcohols of the molecular weight range 62 to 599 g/mol, preferably 62 to 300 g/mol, such as e.g. ethylene glycol, trimethylol propane, propane diol-1,2, butane diol-1,2 or butane diol-2,3, hexane diol, octane diol, dodecane diol and/or octadecane diol, however in particular higher-molecular polyether polyols and/or polyester polyols of the type known in polyurethane chemistry with molecular weights of 600 to 8,000 g/mol, preferably 800 to 4,000 g/mol, which have at least two, as a rule 2 to 8, preferably 2 to 4, primary and/or secondary hydroxyl groups. Examples of such polyols are disclosed in U.S. Pat. No. 4,218,543, column 7, line 29 to column 9, line 32.

The advantages of the process according to the invention are apparent to those skilled in the art, i.e., both the carbodiimide and/or uretone imine group-containing isocyanate and the pre-polymers produced from it have good storage stability and a light color.

These organic isocyanates having carbodiimide- and/or uretone imine groups and the pre-polymers produced from them by reaction with polyols are valuable starting materials for the production of polyurethane plastics by reaction with polyols (e.g. with polyether polyols or polyester polyols) by the isocyanate polyaddition process.

EXAMPLES

The present invention is further illustrated, but is not to be limited, by the following examples.

Starting Products:
isocyanate 4,4'-methylene diphenyl diisocyanate, NCO content: 33.6 wt. % (DESMODUR 44M Bayer AG)
phospholine oxide type catalyst technical mixture of 1-methyl-1-oxo-1-phosphacyclopent-2-ene and 1-methyl-1-oxo-1-phosphacyclopent-3-ene, 10% in toluene
polyol polyether of propylene- and ethylene oxide units with 80-90% primary OH groups, a functionality of 3, an OH number of 28 mg KOH/g and a viscosity of ca 1200 mPas at 25° C. (MULTRANOL 3901 Bayer Corp.)

Procedure for the production of the organic isocyanate having carbodiimide and/or uretone imine groups:

10 kg technical 4,4'-MDI (DESMODUR 44M) with a Hazen color index of <15 APHA, containing 750 ppm 3,5-di-tert-butyl-4-hydroxytoluene, were heated to 60° C. with $N_2$/stirring and 250 mg of the catalyst solution (2.5 ppm; 0.2 mmol) were added. The reaction mixture was heated for 240 min to ca 95° C. with $N_2$/stirring. Carbodiimidization was stopped with the addition of the relevant stopper and stirring was continued for 1 hour. In the examples according to the invention, trifluoromethanesulfonic acid methyl ester (TFMSME) or trifluoromethanesulfonic acid ethyl ester (TFMSEE) and optionally isophthalic acid dichloride (IPDC) were used in the quantities given in the table. Trimethylsilyl trifluoromethanesulfonic acid (TMST) was used in reference examples 1 and 2, and trifluoromethanesulfonic acid (TFMSS) was used in reference example 3, in the respective quantities given in the table. The results are summarized in the table below.

Procedure for the production of a prepolymer of organic isocyanate having carbodiimide and/or uretone imine groups and a polyol:

167 g MULTRANOL 3901 was added to 500 g in each case of the isocyanate produced according to the procedure given above at 50° C. with $N_2$/stirring and the mixture was maintained at 80° C. for a further 2 hours with $N_2$/stirring. The analytical characterization of the pre-polymers was carried out on the following day. To determine the stability of the pre-polymers, isothermal pressure tests (12 h/90° C.) were carried out. The results are summarized in the table below.

The Hazen color index was measured to DIN/EN/ISO 6271-2 (draft September 2002) without solvent against water as a reference in a layer thickness of 5 cm. The measuring device used can be e.g. a Dr. Lange LICO 300 photometer.

| | Isocyanate | | | | | Prepolymer | | Pressure test to determine the storage stability |
| --- | --- | --- | --- | --- | --- | --- | --- | --- |
| | Stopper concentration [ppm] | Stopper | NCO value [%] | Hazen [APHA] | Viscosity at 25° C. [mPas] | Hazen [APHA] | Viscosity at 25° C. [mPas] | Pressure increase rate (pressure test, 12 h, 90° C.) [bar/d] |
| Reference Example 1 | 10 | TMST | 29.47 | 113 | 37 | 79 | 383 | 6 |
| Reference Example 2 | 55 | TMST | 29.53 | 349 | 37 | 155 | 383 | 0.2 |
| Reference Example 3 | 70 | TFMSS | 29.53 | 560 | 36 | 208 | 365 | 0.2 |
| Example 1 | 37 | TFMSME | 29.65 | 83 | 31 | 83 | 332 | 0.4 |
| Example 2 | 40 | TFMSEE | 29.39 | 53 | 35 | 84 | 368 | 0.3 |
| Example 3 | 10/200 | TFMSEE/IPDC | 29.49 | 46 | 34 | 70 | 373 | 0.4 |

Reference examples 1 and 2 make clear the positive influence of the increased stopper quantity of TMST on stability, although this is to the detriment of the color (Hazen). Reference example 3 shows the once again less favorable influence of the stopper trifluoromethanesulfonic acid (TFMSS) on the color (Hazen). In the examples according to the invention, improved stability is achieved in comparison with reference example 1, whist maintaining the good color level (Hazen).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of organic isocyanates having carbodiimide- and/or uretone imine groups, comprising:
   (1) partially carbodiimidizing one or more organic isocyanates with a Hazen color index of ≦100 APHA with a phospholine catalyst and
   (2) adding an alkylation agent to stop the carbodiimidization reaction in which said alkylation agent comprises one or more esters of trifluoromethanesulfonic acid of the structure $CF_3$—$SO_3$—$R^1$, wherein $R^1$ represents an aliphatic, cycloaliphatic or araliphatic radical,
   wherein the resultant organic isocyanates containing carbodiimide- and/or uretone imine groups have a Hazen color index of ≦100 APHA.

2. The process according to claim 1, wherein the alkylation agent comprises aliphatic esters of trifluoromethanesulfonic acid.

3. The process according to claim 1, wherein the alkylation agent comprises methyl-, ethyl-, propyl-, butyl- or pentyl esters of trifluoromethanesulfonic acid.

4. The process according to claim 1, further including addition of an acid and/or an acid chloride and/or a sulfonic acid ester in the step of stopping the carbodiimidization reaction.

\* \* \* \* \*